UNITED STATES PATENT OFFICE.

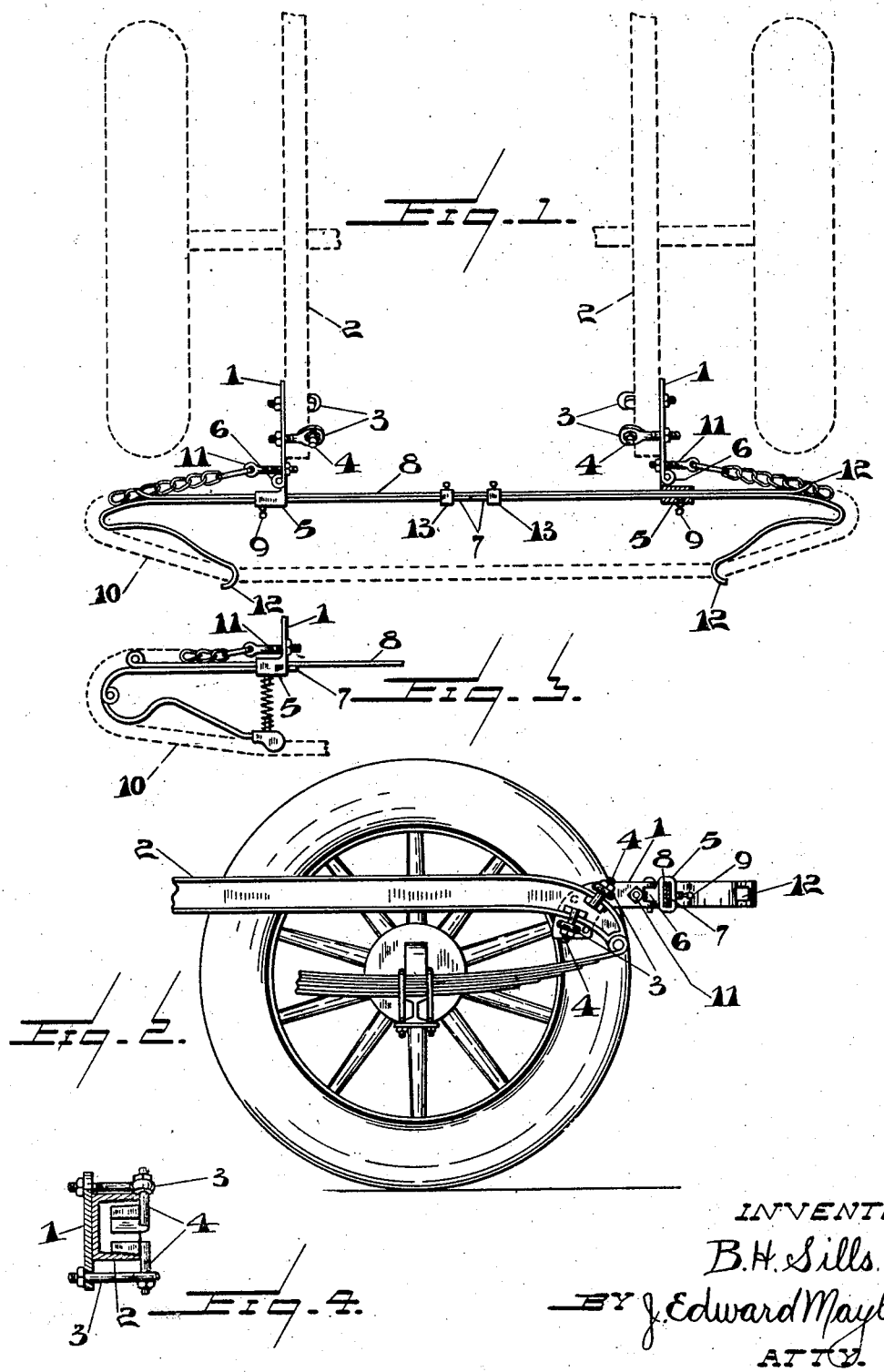

BERTON H. SILLS, OF TORONTO, ONTARIO, CANADA.

FENDER FOR MOTOR-CARS.

1,346,850.

Specification of Letters Patent.　Patented July 20, 1920.

Application filed March 4, 1920. Serial No. 363,231.

*To all whom it may concern:*

Be it known that I, BERTON H. SILLS, a subject of the King of Great Britain, of the city of Toronto, in the county of York, Province of Ontario, Canada, have invented certain new and useful Improvements in Fenders for Motor-Cars, of which the following is a specification.

This invention relates to improvements in the fender described and claimed in my prior Patent No. 1301880 dated April 29th, 1919, and my object is to devise specific constructions which will facilitate manufacture, facilitate the attachment of the device to different cars, and to improve its appearance and efficiency.

I attain my object by means of the constructions hereinafter described and illustrated in the accompanying drawings in which—

Figure 1 is a plan view of the front part of a motor car showing my fender in position;

Fig. 2 a side elevation of the same;

Fig. 3 a plan view of part of a modified form of one of the spring arms; and

Fig. 4 a cross section on an enlarged scale through one of the supporting arms showing it connected with one of the side members of the chassis of a motor vehicle.

In the drawings like numerals of reference indicate corresponding parts in the different figures.

1 are the supporting arms adapted to be secured to the side members 2 of the chassis of a motor vehicle. The connections comprise a pair of eye bolts 3 passing through holes in the supporting arms. Through the eye of each bolt is passed a hook bolt 4, the hooks being adapted to engage the flanges of the side members 2 as shown. To tighten up the nuts of the various bolts, the supporting arms are not only clamped against the sides of the members 2, but also against the flanges thereof.

As the forward ends of the members 2 are usually turned downward as shown, the supporting members are readily tilted to any desired angle by adjusting them backwardly or forwardly on the members 2. The forward end of each side member is formed of a socket 5 connected by means of a hinge 6 with the rearward part of the side member, the pivot of each hinge being substantially vertical. Each socket has a transversely arranged opening therethrough, which sockets are adapted to receive the rear ends of the chain supports 7, which are U-shaped as shown. Preferably also through the sockets is passed a cross stay 8, which is secured in the sockets by means of the set screws 9, which serve also to secure the ends of the chain supports in position. It will be noted that the cross brace and chain supports are formed of flat resilient metal set so that they are longitudinally resilient in a horizontal plane. The chain 10 is secured at its inner ends to the eye bolts 11 secured to the inner ends or other convenient part of the supporting arms 1. The chains are positioned by forming forks 12 on the ends of the chain supports and on the ends of the cross stay 8.

Preferably the inner ends of the chain supports are extended approximately to the center line of the chassis of the vehicle and are secured to the cross stay 8 by the clamps 13. By this arrangement increased stiffness is given to the cross brace, which is important in view of the hinges in the supporting arms.

It will be seen therefore that the fender as a whole comprises the supporting arms connected to an impact receiving portion, which comprises a transverse part longitudinally resilient in a horizontal plane, U-shaped chain supports connected thereto, and a chain carried by the chain supports in front of and substantially parallel to the said transverse part. As the supporting arms are hinged, it follows that any blow against the supporting arms tends to rock the supporting arms on the hinges, which rocking is resisted by the longitudinal resiliency of the transverse member of the fender. Any tendency to break the supporting arms or the chain supports is thus materially reduced, and the resilient resistance of the fender materially increased.

What I claim as my invention is:—

1. A vehicle fender comprising a pair of attaching arms provided with sockets at their forward ends; U-shaped chain supports separate from the attaching arms extending laterally and outwardly and laterally adjustable in said sockets; a chain passing around and extending between said chain supports; and means connecting the ends of the chains to the attaching arms.

2. A vehicle fender comprising a pair of attaching arms provided with transversely arranged sockets at their forward ends; chain supports separate from the attaching arms extending laterally and outwardly and supported in said sockets; a chain supported by and extending between said chain supports; and a cross stay secured in said sockets.

3. A vehicle fender comprising a pair of attaching arms provided with transversely arranged sockets at their forward ends; chain supports separate from the attaching arms extending laterally and outwardly and having their inner parts passing through said sockets; a chain supported by and extending between said chain supports; a cross stay fitting in said sockets; and set screws clamping said chain supports and cross stay in said sockets.

4. A vehicle fender comprising a pair of attaching arms; an impact receiving portion; and hinge connections between the forward ends of the arms and the impact receiving portions, the pivots of said hinges being substantially vertical.

5. A vehicle fender comprising a pair of attaching arms and an impact receiving member connected thereto, said member comprising a transverse part longitudinally resilient in a horizontal plane and provided at its ends with inwardly facing U-shaped chain supports, and a chain carried by the chain supports in front of and substantially parallel to the said transverse part.

6. A vehicle fender constructed as set forth in claim 5 in which the supporting arms are laterally adjustable on the transverse part.

7. A vehicle fender constructed as set forth in claim 5 provided with hinge connections between the supporting arms and the impact receiving portion, the pivots of said hinges being substantially vertical.

8. A vehicle fender constructed as set forth in claim 5 provided with hinges between the forward ends of the supporting arms and the rearward portions, the pivots of said hinges being substantially vertical; and means for laterally adjusting said forward ends on the transverse part of the impact receiving portion of the fender.

9. A vehicle fender provided with attaching arms; two eye bolts passing through each arm and spaced apart to receive the flanged side member of a vehicle chassis between them; and hook bolts passing through the eyes adapted to engage upper and lower flanges of said side member.

10. A vehicle fender comprising a pair of attaching arms; inwardly facing U-shaped chain supports connected thereto, each chain support being provided with a chain guide at its inner end; and a chain passing around said chain supports and through said guides, the inwardly directed part of each chain support being bent to space it from said chain.

Signed at Toronto, Canada, this 23rd day of February, 1920.

BERTON H. SILLS.